Figure 1:
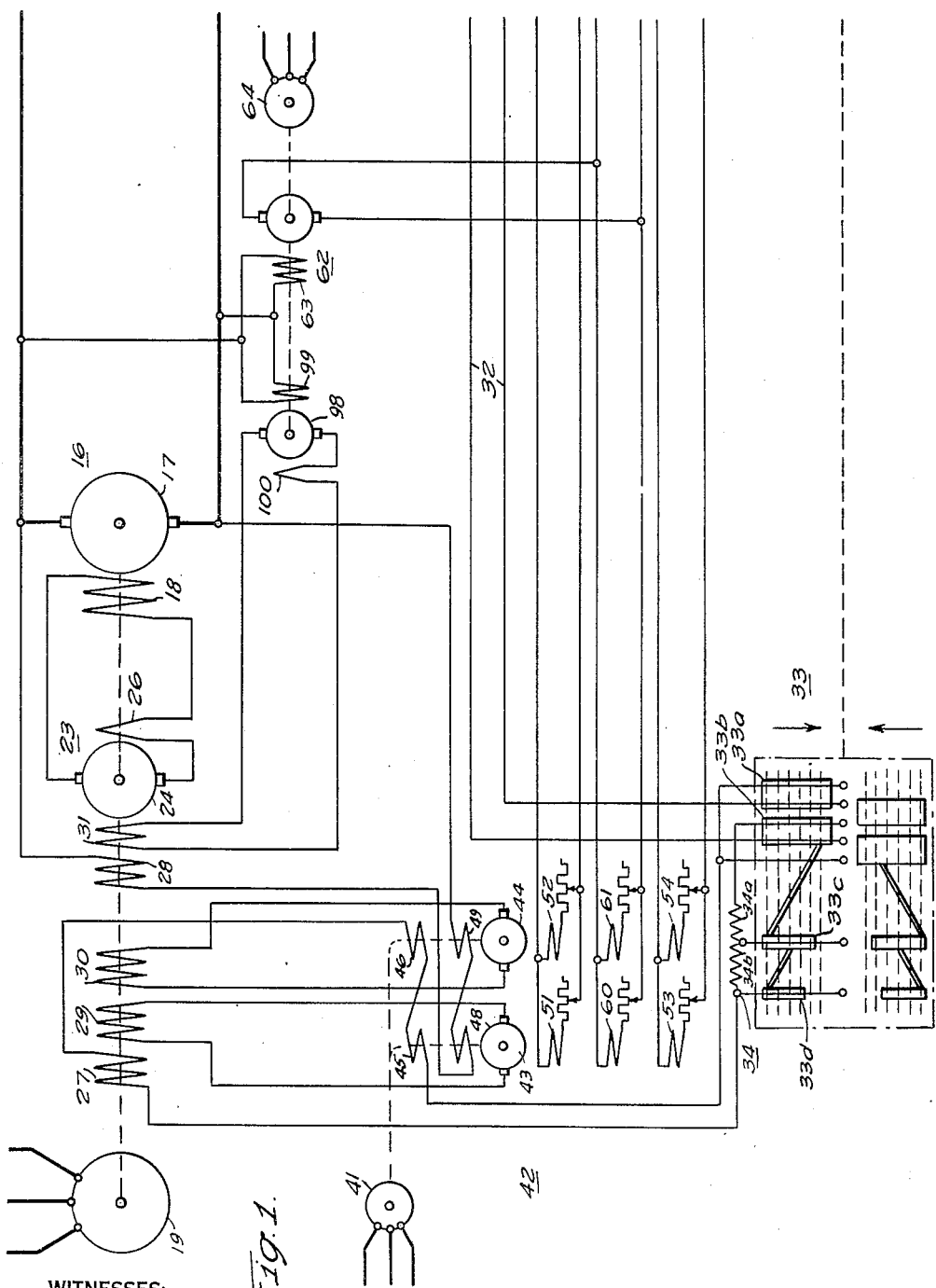

INVENTORS
Glenn E. Stoltz and
Alpheus J. Dolan.

Jan. 9, 1951 G. E. STOLTZ ET AL 2,537,171
CONTROL SYSTEM
Filed Oct. 24, 1946 5 Sheets-Sheet 5

WITNESSES:

INVENTORS
Glenn E. Stoltz and
Alpheus J. Dolan.
BY
ATTORNEY

Patented Jan. 9, 1951

2,537,171

UNITED STATES PATENT OFFICE 2,537,171

CONTROL SYSTEM

Glenn E. Stoltz, Pittsburgh, and Alpheus J. Dolan, East Liberty, Pa., assignors to Westinghouse Electric Corporation, East Pittsburgh, Pa., a corporation of Pennsylvania Application October 24, 1946, Serial No. 705,334

12 Claims. (Cl. 318—143)

Our invention relates, generally, to electrical control systems, and it has reference, in particular, to a control system for reversing blooming mill motors and the like.

Generally stated, it is an object of our invention to provide a control system for reversing motors which is simple and inexpensive to manufacture, and which is easy to operate and maintain.

More specifically, it is an object of our invention to provide a control system for reversing motors wherein complete control of the reversing motor is obtained through the use of regulating generators under the control of a single master switch.

It is an object of our invention to provide for eliminating the usual plurality of contactors and switches heretofore found necessary in motor control systems for reversing mills, and for using regulating generators to obtain smooth control of the motor in response to operation of a master switch.

An important object of our invention is to provide for reversibly operating a motor and for limiting the armature current to predetermined values, when accelerating or regenerating in either direction.

It is also an object of our invention to provide for using regulating generators having substantially suppressed output characteristics over limited operating ranges for controlling the field excitation of a main motor and a main generator in a variable voltage reversing control system, beyond predetermined operating limits.

Yet another object of our invention is to provide an improved and simplified control system for a reversing motor.

It is also another object of our invention to provide for asymmetrically limiting the armature current of a reversing motor under different operating conditions.

Another important object of our invention is to provide for varying the field excitation of a reversing motor in accordance with the speed, armature current, and field current of the motor in order to limit the armature current to different predetermined maximum values when accelerating and regenerating.

It is a further object of our invention to provide for using a regulating generator for operating a circuit breaker to disconnect a motor from a source of electrical energy in the event that the field excitation of the motor is reduced below a predetermined safe operating value.

It is also a further object of our invention to provide for using an auxiliary regulating generator to limit the output voltage of the main generator in a variable voltage control system in the event of failure of the differential field of a regulating generator controlling the main generator.

Still another object of our invention is to provide for using a full-wave rectifier device in circuit relation with a reversible source of control voltage and a source of substantially fixed bias voltage so as to retain the same polarity of the bias voltage relative to the control voltage regardless of the polarity of the control voltage.

Other objects will in part be obvious, and will in part be explained hereafter.

In practicing our invention in one of its embodiments, the field windings of a main motor and a main generator in a variable voltage control system are respectively energized from motor and generator regulating generators of the self-energizing type. The motor regulating generator is differentially responsive to the value of the motor field current and the energization of a pattern field winding which is controlled by a master switch. The generator regulating generator is differentially responsive to the generator voltage, and the energization of a pattern field winding which is varied by the same master switch. Excessive current is prevented by current limit regulating generators, of a type which have a saturating magnetic shunt which produces a suppressed output characteristic for a predetermined operating range. In the case of the main generator, the current limit regulating generators are selectively responsive to the armature current, speed and voltage applied to the motor armature, to decrease or increase the field excitation of the main generator above predetermined operating limits of motor current, so as to limit the motor armature current both when the main generator is generating or motoring. In the case of the motor, the current limit generators selectively increase and decrease the motor field current during motoring and regenerating to secure the same result. Field failure protection is provided for the motor by a regulating generator of the suppressed output type, which generates a voltage in response to reduction of the motor field excitation below a predetermined value to trip the motor circuit breaker. Overvoltage protection is provided by using a regulating generator of the suppressed output type which is responsive to an increase of the generator voltage above a predetermined value to produce a control voltage which reduces the output of the regulating generator controlling the main generator.

Figure 2:
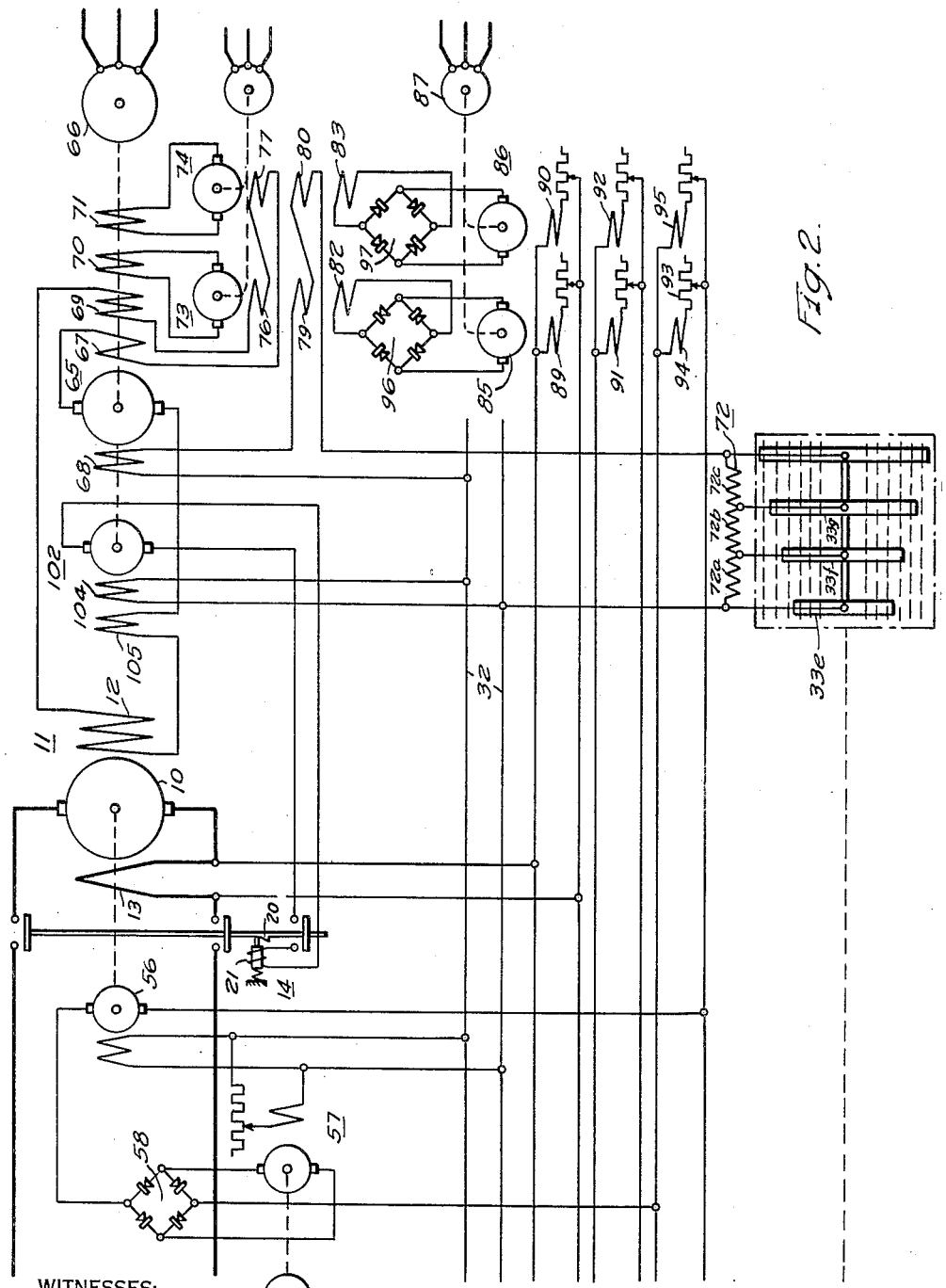
Figure 9:
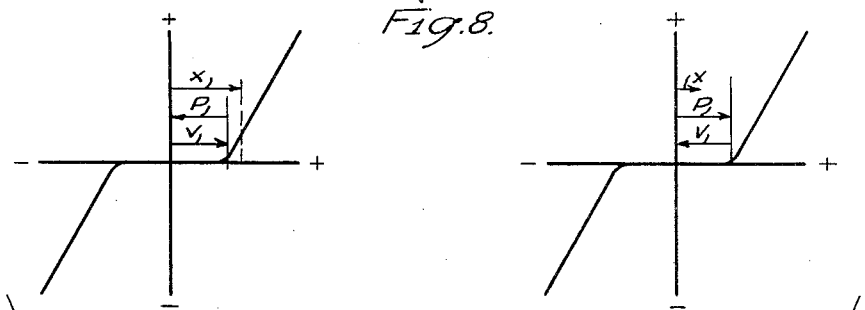
Figure 10:
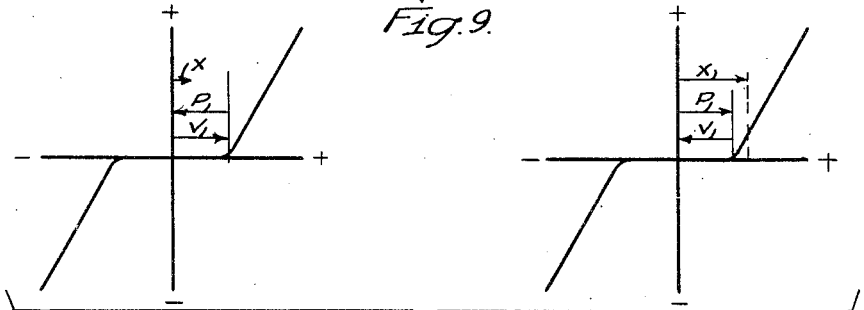
Figures 11, 12:
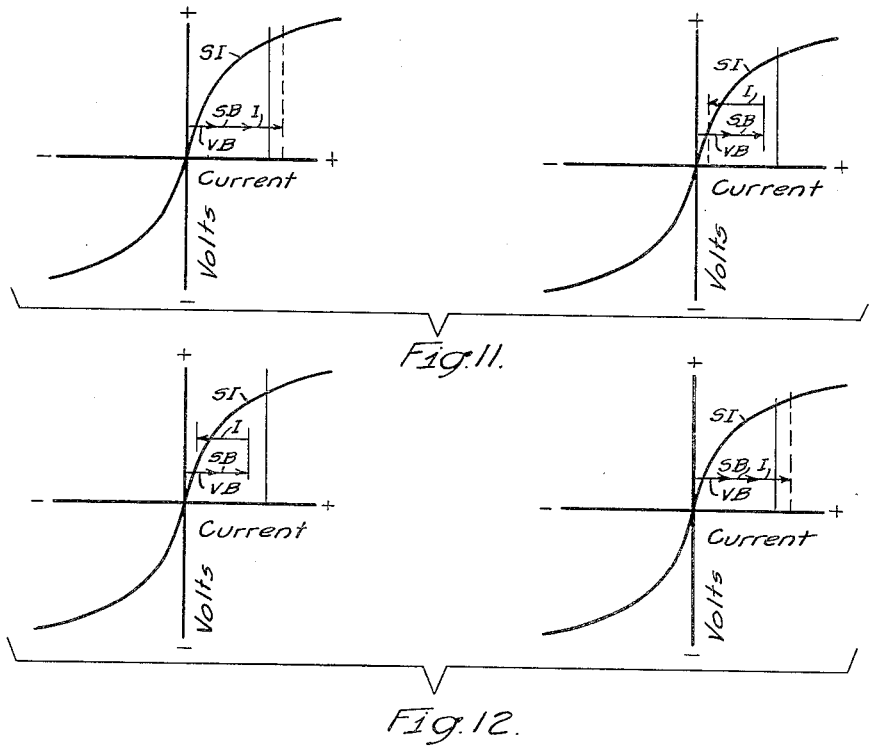

For a more complete understanding of the nature and scope of our invention, reference may be made to the following detailed description, which may be studied in connection with the accompanying drawings, in which:

Figures 1 and 2, taken together, illustrate diagrammatically a control system embodying our invention in one of its forms;

Figs. 3 through 6 show saturation curves and field excitation vectors which illustrate operating characteristics of the generator current limit generators when generating and motoring in the forward and reverse directions, respectively, with the motor armature current in excess of the predetermined maximum value;

Figs. 7 through 10 show saturation curves and field excitation vectors which illustrate the operating characteristics of the motor current limit generators to limit the motor current when motoring and regenerating in the forward and reverse directions, respectively; and Figs. 11 and 12 show saturation curves and field excitation vectors which illustrate operating characteristics of the rectifying pilot generators when the motor is motoring and regenerating in the forward direction.

Referring to Figs. 1 and 2, a variable voltage control system is shown in which the armature 10 of a main motor 11, having a shunt field winding 12 and a compensating field winding 13, is disposed to be connected to a variable voltage source through a circuit breaker 14. The source may comprise a main generator 16 having an armature 17 connected in circuit relation with the motor armature 10 and provided with a field winding 18. Means such as a motor 19 may be used to drive the generator 16. The circuit breaker 14 may be of any suitable type and may be provided with latch means 20 for maintaining the breaker in the closed position. A trip winding 21 may be provided for operating the latch means to open the breaker.

In order to provide for controlling the speed of the main motor 11 up to its base speed under full field conditions, a generator regulating generator 23 may be provided for controlling the output voltage of the main generator by varying the energization of its field winding 18. The generator regulating generator 23 may be provided with an armature 24, which may be driven by the motor 19, and a series-type self-energizing winding 26 for maintaining the output of the regulating generator at any balanced value connected in series circuit relation with the field winding 18, a pattern field winding 27, a control or differential field winding 28, current limit decrease and increase control field windings 29 and 30, and an auxiliary field winding 31. The pattern field winding 27 which determines the energization of the generator field winding 18, may be connected to a suitable source of electrical energy, such as may be illustrated by the conductor 32 of the control bus, through a master switch 33. The master switch may be arranged for varying the energization of the pattern field winding 27 by selectively shunting different sections 34a and 34b of a control resistor 34 connected in circuit relation with the pattern field winding, and for reversibly connecting the pattern field winding to the conductor 32 through the resistor 34 in a similar manner for reversing the energization of the generator field winding 18. The control or differential field winding 28 of the regulating generator 23 may be energized in accordance with the voltage of the main generator by connecting it across its armature 17 so that it opposes the pattern field winding and tends to reduce the generator voltage. The functions of these current limit and auxiliary field windings will be explained hereinafter in detail.

In order to provide for limiting the main motor current to different predetermined maximum values under different operating conditions, current limit means 42 may be provided. In this instance it comprises, a current-limit decrease regulating generator 43 and a current-limit increase regulating generator 44, which become effective to limit the armature current only after it exceeds predetermined different values under different conditions. These generators may be driven in any suitable manner, being connected, for example, to a common motor 41 and may be arranged to limit the current of the main motor 11 by controlling the generator regulating generator 23 so as to reduce the voltage of the main generator 16. The regulating generator 43 may be connected to energize the field winding 29 while the regulating generator 44 may energize the field winding 30 of the generator regulating generator 23.

The regulating generators 43 and 44 may be provided with pattern field windings 45 and 46, respectively, which may be connected in circuit relation with the pattern field winding 27 of the generator regulating generator 23. Control field windings 48 and 49 may also be provided on the generators 43 and 44 for opposing their pattern field windings. The field windings 48 and 49 may be connected in circuit relation with the control field winding 28 of the generator regulating generator 23. The current limit generators 43 and 44 may be of the saturating magnetic shunt type, which is well-known in the art, having substantially suppressed output characteristics over limited operating ranges so that they are effective to produce voltages for increasing or decreasing the output of the regulating generator 23 only when the effective magnetization, as determined by the motor armature current and speed, exceeds a predetermined value.

In order to provide for producing a control voltage for limiting the armature current of the main motor 11, current windings 51 and 52 may be provided on the regulating generators 43 and 44, which may be energized by being connected across the compensating winding 13 of the motor 11. Since the maximum permissible value of armature current depends upon the speed of the motor, speed bias control field windings 53 and 54 may be provided on the regulating generators 43 and 44 for modifying the action of the current windings 51 and 52. These field windings may be energized from a tachometer generator 56, which may be connected in circuit relation with a source of bias voltage such as the generator 57 through a full-wave rectifier bridge circuit 58. This connection of the bias generator 57 insures the same relative polarity of the bias voltage relative to the speed-responsive voltage from the tachometer generator 56 regardless of the direction of operation of the main motor 11.

Voltage bias field windings 60 and 61 also may be provided on the regulating generators 43 and 44 energized in opposite senses for biasing these generators in opposed senses so that they are selectively responsive to different directions of the armature current for a given direction of rotation of the motor 11. They may be, for example, energized from a generator 62 of the saturating type which produces a substantially constant output voltage. The field winding 63 of the generator 62 may be connected across the generator armature 17, and the generator may be driven by a motor 64. This permits using the regulating generator 43 to decrease the voltage of the main generator 16 when it is generating, and using the regulating generator 44 to increase the voltage of the main generator 16 when it is motoring, to limit the armature current of the main motor 11 for either direction of rotation of the motor. If desired, only a single current limit generator may be used without the bias voltage if means is provided for reversing the output when the main generator and motor are reversed.

Operation of the motor 11 may also be effected by varying the energization of its shunt field winding 12. This shunt field winding 12 may be, for example, energized from a regulating generator 65 driven by a motor 66 and having a self-energizing series-type field winding 67 connected in circuit relation with the shunt field winding 12. Pattern and control or differential field windings 68 and 69 may be provided in conjunction with current-limit increase and decrease field windings 70 and 71, respectively.

The pattern field winding 68 of the regulating generator 65 may be energized from the conductors 32 in conjunction with a field resistor 72 through the same master switch 33 which is used to control the energization of the pattern field winding 27 of the generator regulating generator 23. The control or differential field winding 69 may be connected in circuit relation with the shunt field winding 12 for opposing the effect of the pattern field winding 68 so as to tend to reduce the field current and maintain predetermined energization of the shunt field winding 12.

Energization of the current limit field windings 70 and 71 to limit the peaks of the armature current of the motor 11 may be effected by a current-limit increase regulating generator 73 and a current-limit decrease regulating generator 74, respectively, of a type similar to the current-limit regulating generators 43 and 44. These regulating generators 73 and 74 may be provided with control field windings 76 and 77, which may be connected in circuit relation with the control field winding 69 of the motor regulating generator 65. Opposing pattern field windings 79, 80 may also be provided and connected in circuit relation with the pattern field winding 68 of the motor regulating generator 65. Additional control field windings 82 and 83 may be provided for energization in response to different operating characteristics of the motor 11.

Energization of the additional control field windings 82 and 83 may be, for example, effected from pilot rectifying generators 85 and 86, respectively, which may be driven by a common motor 87. The rectifying generators 85 and 86 may be provided with current field windings 89 and 90, which may be connected across the compensating field winding 13 of the motor 11 so as to be energized in accordance with the motor armature current. Voltage-bias field windings 91 and 92 may also be provided for rendering the rectifying generators selectively effective for motoring and regenerating conditions of the motor 11 and being connected in parallel circuit relation with the voltage-bias field windings 60 and 61 of the current-limit regulating generators 43 and 44 of the main generator 16.

Speed-bias field windings 94 and 95 may be provided for varying the output of the rectifying generators 85 and 86 in accordance with the motor speed and may be connected in parallel circuit relation with the speed-bias field windings 53 and 54 of the current-limit generators 43 and 44. Means such as the control resistor 93 may be provided in circuit with each of the current, speed-bias and voltage-bias field windings of the rectifying generators and the generator current-limit generators to vary the operating levels thereof. In order to maintain a predetermined polarity on the additional control field windings 82 and 83, since the polarity of the shunt field winding 12 is never reversed, means such as the full-wave rectifier bridge circuits 96 and 97 may be connected between the rectifying generators 85, 86 and the field windings 82, 83, respectively. As in the case of the generator only a single current-limit generator may be used with the motor by omitting the bias voltage and adding reversing switch means to maintain the polarity of the output when the main motor reverses.

In order to prevent the pattern field winding 27 of the regulating generator 23 from raising the voltage of the generator 16 to a dangerously high value should the control or differential field winding 29 fail, means such as the auxiliary regulating generator 98 may be provided. The generator 98 may be driven by the motor 64, and it may be of the saturation shunt suppressed output type, having a field winding 99 which may be connected across the armature 17 of the main generator and a series type self-energizing field winding 100.

The field winding 99 normally produces insufficient magnetization to produce any appreciable output so long as the voltage of the main generator 16 remains within safe limits, for example 110% of normal voltage. As soon as the voltage rises above this value, however, the generator 98 develops an output voltage and because of the self-energizing winding 100, the output increases rapidly. The auxiliary field winding 31 of the regulating generator 23 opposes the pattern field winding 27 and holds the voltage of the main generator 16 to a safe value.

With a view to protecting the motor 11 against field failure, a field failure generator 102 may be provided. The generator 102 may be driven by the motor 66, and it may be of the saturating shunt, suppressed output type, having a pattern field winding 104, which may be connected to the bus conductor 32 or in parallel circuit relation with the motor field winding 12. A control field winding 105, opposing and normally neutralizing the pattern field winding 104, may be connected in series with the motor field winding 12. The generator 102 may be connected to effect energization of the trip winding 21 of the latch means 20 to trip the circuit breaker 14 whenever the energization of the field winding 12 is reduced to an unsafe value.

With the circuit breaker 14 closed and the bus conductors 32 energized, operation of the main motor 11 may be effected by actuating the master switch 33 in the forward direction to connect the pattern field winding 27 of the generator regulating generator 23 to the conductors 32 through segments 33a and 33b of the switch, and resistor 34. Further operation of the master switch in the same direction successively shunts sections 34a and 34b of the control resistor 34 through segments 33c and 33d, respectively, and increases the energization of the pattern field winding 27. The output of the generator regulating generator 23 increases correspondingly until the voltage across the armature 17 of the main generator is sufficient to cause the control or differential field winding 28 to balance the effects of the pattern field winding 27. Each time this condition occurs, a stable operating condition is reached and the self-energizing series-type field winding 26 maintains the voltage of the regulating generator 23 at the balancing value. The energization of the field winding 18 of the main generator 16 is thus controlled in accordance with the position of the master switch 33, thus controlling the voltage produced by the generator 16 which is applied to the armature 10 of the main motor 11.

Substantially full field excitation is maintained on the main motor 11 under the control of the motor regulating generator 65 until the motor reaches its base speed when the voltage of the generator 16 will be at its normal value. Further operation of the master switch 33 in the same direction as hereinbefore recited successively removes shunts from portions 72a, 72b and 72c of the field resistor 72 through movement of segments 33e, 33f and 33g, thus progressively weakening the energization of the pattern field winding 68 of the regulating generator 65. Decreased energization of the pattern field winding 68 causes a corresponding decrease in the output of the motor regulating generator 65, thus reducing the energization of the motor shunt field winding 12.

When operating with the master switch in any given operating position, the voltage of the main generator 16 is maintained substantially constant by the regulating action of the generator regulating generator 23, whose output is self-regulated at the level determined by the position of the switch. The motor regulating generator 65 maintains a predetermined motor speed in response to the energization of its pattern field winding 68. Any change of generator voltage or motor field current causes their respective regulating generators to restore the predetermined operating condition.

Reverse operation of the master switch 33 first progressively increases the energization of the motor field winding 12, and then reduces the output of the main generator 16. Further operation of the master switch in the reverse direction reverses the connections of the pattern field winding 27 of the generator regulating generator 23 and causes a reverse voltage to be applied to the motor 11 by the generator 16. Continued operation of the master switch in the reverse direction increases the generator voltage and then decreases the motor field sequentially in a manner similar to that for forward operation to increase the speed of the motor 11 in the reverse direction.

In order to clearly understand the operation of the current-limit regulating generators 43 and 44, reference may be made to Figs. 3 through 6. In these figures, the curve S represents in each case the saturation or characteristic output curve of the current-limit generator. It will be seen that the saturation curve follows the horizontal axis for a predetermined minimum magnetizing effect, so that the voltage output of the current-limit generator remains at substantially zero throughout a predetermined operating range; after which its output rises fairly rapidly in response to increased magnetization. The current-limit generators are, therefore, only effective outside this predetermined operating range.

Figure 3:
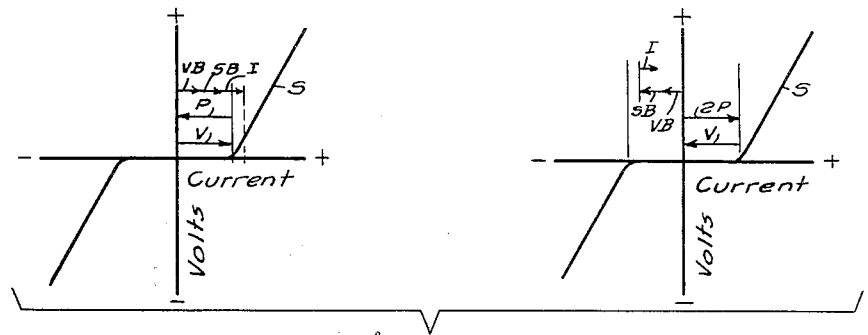

Referring to Fig. 3, the portion $a$ of the figure shows a curve and vectors which illustrate the operating characteristics of the current-limit decrease regulating generator 43. It will be understood that when the main generator 16 is generating and the main motor 11 is operating in the forward direction, the vector P, representing the magnetization produced by the pattern field winding 45 of the regulating generator 43, is substantially balanced by the opposing vector V, which represents the magnetization produced by the voltage or control winding 48. Accordingly, the effects of these windings are substantially neutralized.

It will be observed, however, that the magnetizations produced by the voltage-bias winding 60, the speed-bias winding 53 and the current winding 51, as represented by the vectors SB, VB and I, are cumulative. Whenever the sum of the vectors representing these three magnetizations extends to the right of the knee in the curve S, which will occur when the motor current reaches an excessive value for any particular motor speed, the current-limit decrease generator 43 produces a control voltage which is effective to energize the field winding 29 of the regulating generator 23. This energization will be in such a direction as to reduce the output of the regulating generator 23 and hence reduce the energization of the generator field winding 18. Accordingly, its effect is to reduce the voltage applied to the armature of the main motor 11 and hence limit the armature current of the motor.

Referring to portion $b$ of Fig. 3, which illustrates the operating characteristics of the current-limit increase generator 44, it will be seen that the control and pattern field winding magnetization vectors V and P are reversed with respect to those of the current-limit generator 43. Likewise, the voltage-bias and speed-bias vectors VB and SB are reversed. Accordingly, when the main motor current is in the forward direction, as is the case when the main generator is generating in the forward direction, it will be seen that the current vector I must be relatively large before it can overcome the effects of the vectors VB and SB to extend past the knee of the saturation curve S to produce any output. Accordingly, the current-limit increase regulating generator 44 is substantially ineffective during forward operation of the main generator while it is generating.

Figure 4:
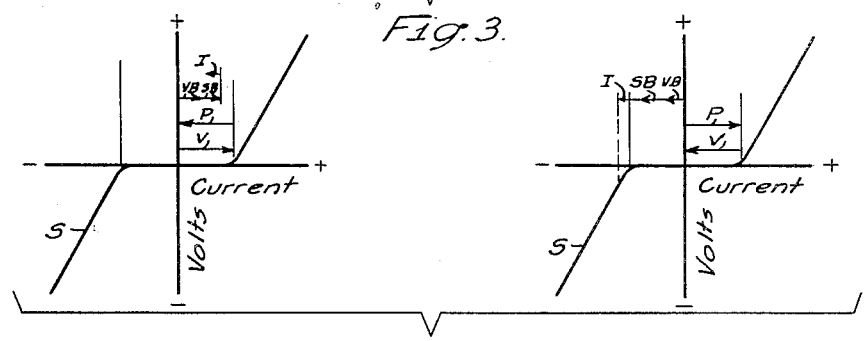

Referring to Fig. 4, which shows curves and vectors illustrating the operating characteristics of the current-limit generators 43 and 44 when the main generator is motoring in the forward direction, it will be seen from portion $a$ that the voltage and pattern vectors have the same polarities as in portion $a$ of Fig. 3. Likewise, the voltage-bias and speed-bias vectors VB and SB, respectively, have the same polarity. The current vector I is, however, reversed since when the main generator is motoring, the counter E. M. F. or back voltage of the main motor is greater than the voltage produced by the main generator so that the direction of the current in the main motor and main generator armatures reverses. Since it will require a relatively large value of current to produce a magnetization sufficient to overcome the opposing magnetizations of the vectors VB and SB, it will be appreciated that the current-limit increase regulating generator 43 is rendered substantially ineffective when the main generator is motoring in the forward direction.

Referring to portion b of Fig. 4, it will be seen that the pattern, voltage, speed-bias and voltage-bias magnetizations which are represented by the vectors P, V, VB and SB, respectively, are in the same directions as shown in portion b of Fig. 3. Since the direction of the armature current represented by the vector I is reversed, it is cumulative with respect to the vectors VB and SB. The sum of these three vectors extends beyond the knee of the saturation curve S when the main motor armature current reaches an excessive value for any particular motor speed, so that the current-limit increase generator 44 has an effective output. The current-limit winding 30 of the regulating generator 23 is thereby energized in such a direction as to increase the output of the regulating generator 23. The voltage of the main generator 16 is correspondingly increased so that the reversely circulating armature current is reduced.

Figure 5:
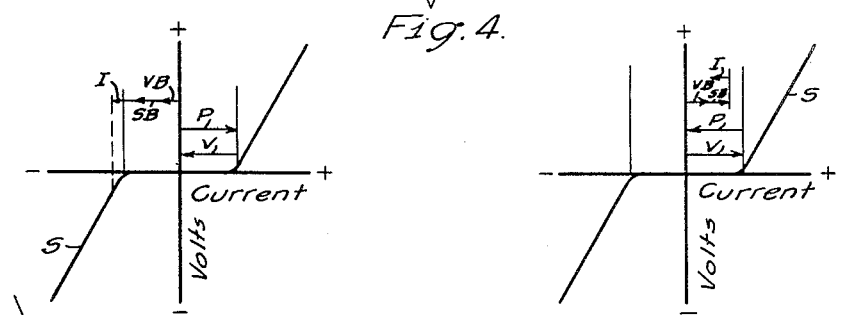
Figure 6:
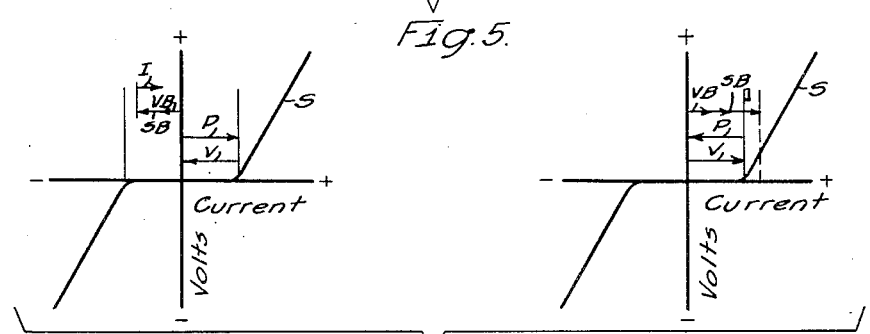

Referring to Figs. 5 and 6, it will be seen from portion a of Fig. 5 and portion b of Fig. 6 that the current-limit decrease regulating generator 43 will be effective to limit the main motor armature current to a predetermined value for any speed during generating in the reverse direction, while the current-limit increase regulating generator 44 will be effective to limit the armature current when the main generator is motoring in the reverse direction.

Referring to Figs. 7 through 10, portion a of these figures show the saturation curve S and vectors illustrating the operating characteristics of the current-limit regulating generator 73, while portions b illustrate corresponding characteristics of the generator 74. From portion a of Fig. 7 it will be seen that the magnetizing effects of the pattern and control field windings 79 and 76 of the regulating generator 73 are represented by the opposing vectors P and V, respectively. The unidirectional output of the rectifying generator 85 may be represented by the single vector X. Accordingly, whenever the output of the rectifying generator 85 produces a magnetizing force which extends to the right of the knee of the saturating curve S, the regulating generator 73 will be effective to increase the energization of the shunt field winding 11 so as to slow down the main motor 11 and reduce its armature current to the predetermined desired submaximum value for the particular motor speed.

Figure 7:
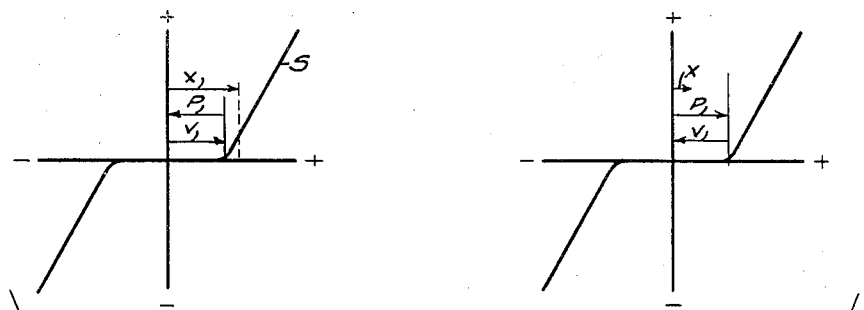

Referring to portion b of Fig. 7, it will be seen that the voltage and pattern sectors V and P are reversed in the case of the current-limit decrease regulating generator 74, and that while the main motor is accelerating in the forward direction, the output of the rectifying generator 86 is of of relatively low value as shown by the vector X. Accordingly, the regulating generator 74 has substantially zero output under these conditions and is effective to vary the energization of the shunt field winding 12 of the main motor.

Figure 8:
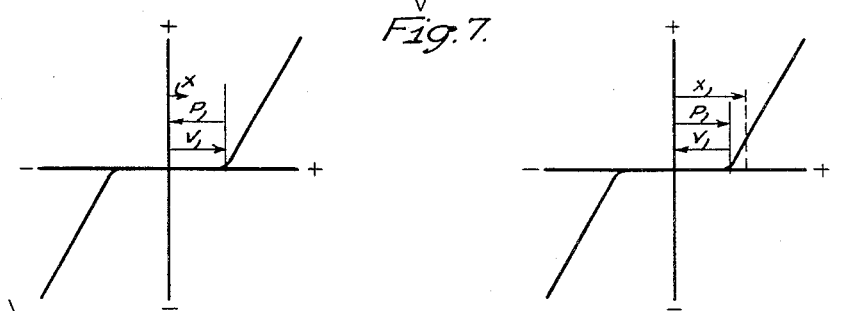

Referring to Fig. 8, it will be seen that the vector X in portion a of the figure is relatively small so that the regulating generator 73 is ineffective to vary the armature current of the main motor when the motor is regenerating in the forward direction. As shown in portion b of Fig. 8, the output of the rectifying generator 86, as represented by the vector X, is relatively large when the motor current is excessive for a particular speed, so that the regulating generator 74 may be effective to energize the field winding 71 in such a direction as to decrease the energization of the shunt field winding 12. The speed of the main motor 11 may thereby be increased, so as to reduce the reversely circulating armature current during regeneration.

Referring to Figs. 9 and 10, it will be apparent that when the motor is operating in the reverse direction, the regulating generator 73 is effective to increase the excitation of the field winding 12 during motoring, while the regulating generator 74 may be effective to decrease the energization of the field winding 12 during regeneration, so as to reduce the armature current in both instances.

Referring to portion a of Fig. 11, curve SI may represent the saturation or characteristic curve and the vectors VB, SB and I may represent the magnetizing effects of the voltage-bias winding 91, the speed-bias winding 94 and the current winding 89, respectively, of the rectifying generator 85 when the main motor 11 is motoring in the forward direction. Since these three vectors are in the same direction, they add to provide the relatively large output vector X shown in portion a of Fig. 7. From portion b of Fig. 11, it will be seen that the voltage-bias winding and the speed-bias winding are opposed to the current winding for the motoring condition in the forward direction. Hence the vectors VB and SB add, while the vector I substracts from the sum, leaving the relatively small resultant represented by the vector X shown in portion b of Fig. 7.

From Fig. 12 it will be seen that when regenerating in the forward direction, the current vector I subtracts from the voltage-bias and speed-bias vectors VB and SB so that only a relatively small resultant magnetization remains, which is represented by the vector X as shown in portion a of Fig. 8. This relatively small output is insufficient to produce any output from the current limit regulating generator 73. On the other hand, as shown in portion b of Fig. 12, the magnetizing effects of the three field windings on the rectifying generator 86 are cumulative, so that the resultant is relatively large, as shown by the vector X in portion b of Fig. 8. Accordingly, the current-limit generator 74 will be effective to decrease the net excitation of the field winding 11. This permits the main motor to speed up and reduce the reverse armature current.

Under normal operating conditions the field failure regulating generator 102 produces substantially zero output since its pattern field winding 104, which is energized from the conductors 33, will be balanced by the control or differential field winding 105 connected in circuit relation with the field winding 12. Should the energization of the field winding 12 be reduced below a predetermined safe value, an unbalanced condition will be produced between the pattern and control field windings. Accordingly, the field failure generator produces an output voltage sufficient to energize the trip winding 21 and open the main circuit breaker 14.

While the voltage of the main generator 16 remains within a predetermined safe range of its normal operating value, the magnetization produced by the control field winding of the voltage-differential generator 98 will be insufficient to produce any appreciable output since this generator is of the saturated, suppressed-output type similar to that described in connection with the current-limit generators 43 and 44. However, should the voltage of the main generator 16 exceed a predetermined safe value, the magnetization produced by the control field winding 99 becomes sufficient to produce an output voltage. Since the voltage-differential generator 98 is of the self-energizing type, the energization of differential field winding 31 on the generator regulating generator 23 increases rapidly and it becomes sufficiently energized to reduce the effect of the pattern field winding 27 and limit the main generator voltage to a safe value.

From the above description and the accompanying drawings, it will be apparent that we have provided a new and novel control system whereby smooth and accurate control of the main reversing motor may be obtained under the control of a single master switch. The plurality of switches and contactors heretofore necessary for increasing and decreasing the generator voltage and the motor field have been obviated, thus removing their ever present problem of maintenance. Instead of a multiplicity of panels covered with contactors and circuit interrupters, only a relatively few regulating generators are required which necessitate a minimum of maintenance. With a control system embodying the features of our invention, the armature current of the main motor may be limited to different predetermined values under different operating conditions. For example, the motoring current may be limited by the current-limit increase motor regulating generator to approximately 230% up to the base speed of the main motor and then tapered off to 210% at twice the motor base speed. Motor current may be limited by the current-limit decrease generator regulating generator to 260% of rated current up to base speed of the main motor and then tapered off to 230% at twice the base speed of the motor. Regenerating current may be limited by the current-limit decrease motor regulating generator to 140% of rated current at base speed and below. Above base speed it may be tapered to 90% of rated armature current at twice the base speed. Regenerative current may be limited by the current-limit increase generator regulating generator to 160% of the rated armature current at base speed and below. Above the base speed the current may be tapered to 105% at twice the base speed.

By using a pair of current-limit regulating generators for the main generator and another pair for the main reversing motor, different current limits may be realized during motoring and regeneration. By using pairs of regulating generators in this manner, all contactors may be omitted from the control system. The current-limit control on the main reversing motor may be used from the first point on the controller up to the maximum speed of the motor, even though the motor operates with full field up to base speed. The increased torque obtained with the main motor at full field will be due to forcing its field beyond normal. In this manner the maximum torque may be obtained at low speeds, which is important as unusual drafts are sometimes taken with the master switch on the first or second point.

Since certain changes may be made in the above-described construction, and different embodiments of the invention may be made without departing from the spirit or scope thereof, it is intended that all the matter contained in the foregoing description or shown in the accompanying drawings shall be interpreted as illustrative and not in a limiting sense.

We claim as our invention:

1. For use in controlling a motor having an armature and a field winding, circuit means connecting the armature of the motor to a source of electrical energy, a regulating generator of the self-energizing type connected to control the voltage of the source, an additional regulating generator of the self-energizing type connected to control the energization of the field winding of the motor, and circuit means including a pair of auxiliary regulating generators connected to control one of the aforesaid regulating generators, said auxiliary regulating generators having suppressed output characteristics selectively responsive to operating characteristics of the motor to limit its armature current to predetermined values in the forward and reverse directions.

2. In a control system for a motor having an armature and a field winding, means connected to apply a variable voltage to the motor armature, a regulating generator of the self-energizing type having an armature connected to effect energization of the motor field winding and having a plurality of field windings including opposed windings energized in accordance with the motor field current and according to a predetermined standard, current-limit means comprising a pair of auxiliary regulating generators of the suppressed output type operable to produce a control voltage only when the motor armature current exceeds a predetermined value, said auxiliary regulating generator being connected to vary the output of the regulating generator so as to reduce motor armature current peaks, and means responsive to the speed, armature voltage and armature current of the motor operable to produce a unidirectional control voltage for modifying the output of the current-limit means.

3. For use in a reversible variable voltage system for a motor connected in driving relation with a reversing rolling mill stand and having a field winding and an armature connected in circuit with the armature of a main generator having a field winding, a regulating generator of the self-energizing type having an armature connected to energize the main generator field winding and having a plurality of field windings including a pattern field winding and a control field winding energized in accordance with the voltage applied to the motor armature, an additional regulating generator of the self-energizing type having an armature connected to energize the motor field winding and having a plurality of field windings including a pattern field winding and a control field winding energized in accordance with the motor field winding current, control means operable to connect the pattern field winding to a source of electrical energy including a master switch operable to reversibly connect the field winding of the regulating generator associated with the main generator field winding to a source of electrical energy, said control means being effective to sequentially vary the connections of the generator and motor regulating generator pattern field windings, and circuit means operable to limit the armature current of the motor including a pair of auxiliary regulating generators of the saturating magnetic shunt suppressed-output type responsive to current, speed and voltage conditions of the motor and connected to effect energization of another of the generator and motor regulating generator field windings so as to limit the motor current to predetermined values dependent on the speed and voltage conditions of the motor.

4. In a motor control system, control means producing a reversible control voltage for the motor dependent on the speed and direction of rotation of the motor, circuit means producing a unidirectional bias voltage, a full wave bridge type rectifier circuit having one pair of diagonally opposite terminal points connected across said circuit means and additional circuit means connecting the other pair of diagonally opposite terminals of the full-wave bridge rectifier circuit in circuit relation with the means producing the control voltage so as to retain the same polarity of the bias voltage relative to the reversible control voltage.

5. In a control system for a motor having an armature and a field winding, means connecting the armature of the motor to a source of electrical energy, a regulating generator having an armature connected to effect energization of the motor field winding and having a plurality of field windings, means including a control switch connecting one of said field windings to a source of electrical energy for producing a pattern field. circuit means connecting another of said field windings for energization in accordance with the current in the motor field winding to oppose said one field winding, control means including a control generator responsive to the speed, armature voltage and current of the motor operable to produce a unidirectional control voltage, and an additional regulating generator responsive to the output of the control generator as well as the motor field current and the energization of the aforesaid regulating generator field winding, said additional regulating generator being connected to energize another of the said regulating generator field windings to limit the armature current of the motor to predetermined different values for different operating conditions of the motor.

6. A control system for a motor having an armature and a field winding comprising, a main generator having a field winding and an armature connected in circuit relation with the motor armature, a generator regulating generator having a plurality of field windings and an armature connected to effect energization of the main generator field winding, a motor regulating generator having a plurality of field windings and an armature connected to effect energization of the motor field winding, and means comprising regulating generators of the suppressed-output type responsive to operating characteristics of the motor and connected to modify the output of the motor and main generator regulating generators to limit the motor armature current to different values under different operating conditions.

7. A motor system comprising, a reversing motor having an armature and a field winding, variable voltage means connected to apply a voltage reversibly to the armature of the motor, means including a control generator responsive to the speed, armature current and armature voltage of the motor disposed to produce a unidirectional control voltage in response to said characteristics, a regulating generator of the self-energizing type connected to effect energization of the motor field winding in accordance with a predetermined pattern, and means modifying the output of the regulating generator comprising a pair of additional regulating generators responsive to speed, armature current and field current of the motor, said pair of additional regulating generators being biased in opposite senses and connected to selectively decrease and increase the motor field currents to limit the motor armature current when motoring and regenerating, respectively.

8. In a control system for a motor having an armature energized from a variable and reversible current source and a field winding, current-limit means selectively producing opposed control voltages responsive to the value and the direction of the motor armature current and motor speed, a regulating generator differentially responsive to the motor field current and a predetermined pattern field connected to energize the motor field winding, and a pair of current-limit generators having a predetermined range of substantially zero output selectively responsive to the motor field current and pattern field energization to reduce or increase the motor field energization depending on whether the motor is driving or braking.

9. In a control system, a reversing motor having an armature and a field winding, circuit means connected to apply a variable reversible voltage to the motor armature, means producing a substantially constant bias voltage dependent on the direction of operation of the motor, circuit means including a reversible speed pilot generator and a fixed bias voltage connected in circuit with the pilot generator to produce a uniformly biased reversible speed responsive voltage, means producing a control voltage responsive to the value and direction of flow of the motor armature current, a pair of generators responsive in opposite senses to the speed responsive voltage and the directional bias voltage and responsive in the same senses to the motor armature current voltage, means rectifying the outputs of said pair of generators, a regulating generator of the self-exciting type connected to effect energization of the motor field winding in accordance with a predetermined pattern, and current limiting means modifying the output of said regulating generator comprising additional regulating generators of the self-exciting type having substantially zero output characteristics for predetermined operating ranges, said additional regulating generators being selectively responsive in opposite senses to the differential between the pattern energization of the first-mentioned regulating generator and the motor field current and the outputs from said pair of additional regulating generators.

10. In a control system, a reversing motor having an armature and a field winding, a generator having an armature connected in circuit relation with the motor armature and having a field winding, a regulating generator connected to effect energization of the generator field winding and having a pattern field winding and an opposed control field winding energized in accordance with the voltage applied to the motor armature, means including a master switch operable to vary and reverse the energization of the generator field winding in a predetermined sequence, current limit means modifying the output of the regulating generator in opposite senses to limit the motor armature current under motoring and regenerating conditions, said means comprising a pair of auxiliary regulating generators of the suppressed output type responsive to the speed, direction of operation and armature current of the motor, an additional regulating generator connected to effect energization of the motor field winding having a control field winding and a pattern field winding energized variably in sequence with the energization of the generator field winding through the master switch, and additional current limit means comprising a pair of auxiliary regulating generators of the suppressed output type responsive to the motor speed, field energization and armature voltage and a directional bias voltage effective to limit the current of the motor armature to predetermined values under different operating conditions.

11. In a control system for a motor having an armature and a field winding; a circuit breaker connecting the armature to a source of electrical energy and having trip means, and circuit means including a generator having an armature connected to energize the trip means, a pattern field winding connected to a source of electrical energy, and a control field winding connected in circuit relation with the motor field winding to neutralize the effects of the pattern field winding when the motor field winding is energized within a normal operating range of values.

12. In a control system for a motor, a main generator having an armature connected to energize the motor and having a field winding, a regulating generator connected to energize said field winding and having a self-energizing field winding of the series type and provided with a pattern field winding energized from a source of control voltage and an opposing control field winding energized in accordance with the voltage supplied by the main generator to the motor, means comprising an auxiliary regulating generator of the suppressed output type having a field winding energized in accordance with the voltage supplied by the main generator, said auxiliary regulating generator being disposed to produce a control voltage in response to an increase in the main generator voltage above a predetermined normal value, and means comprising an auxiliary field winding on the regulating generator connected to the auxiliary regulating generator to oppose the pattern field winding of the regulating generator and prevent excessive generator armature voltage should the control field winding become deenergized.

GLENN E. STOLTZ.
ALPHEUS J. DOLAN.

REFERENCES CITED

The following references are of record in the file of this patent:

UNITED STATES PATENTS

| Number | Name | Date |
| --- | --- | --- |
| 1,422,120 | Meyer | July 11, 1922 |
| 2,347,037 | Edwards et al. | Apr. 18, 1944 |
| 2,414,516 | Formhals et al. | Jan. 21, 1947 |
| 2,473,721 | Montgomery et al. | June 21, 1949 |